Oct. 28, 1969     F. KAMILA     3,474,891
APPARATUS FOR ORIENTED STACKING AND TIMED POSITIONAL
DELIVERY OF STICK LOLLIPOPS
Filed Dec. 26, 1967     5 Sheets-Sheet 5

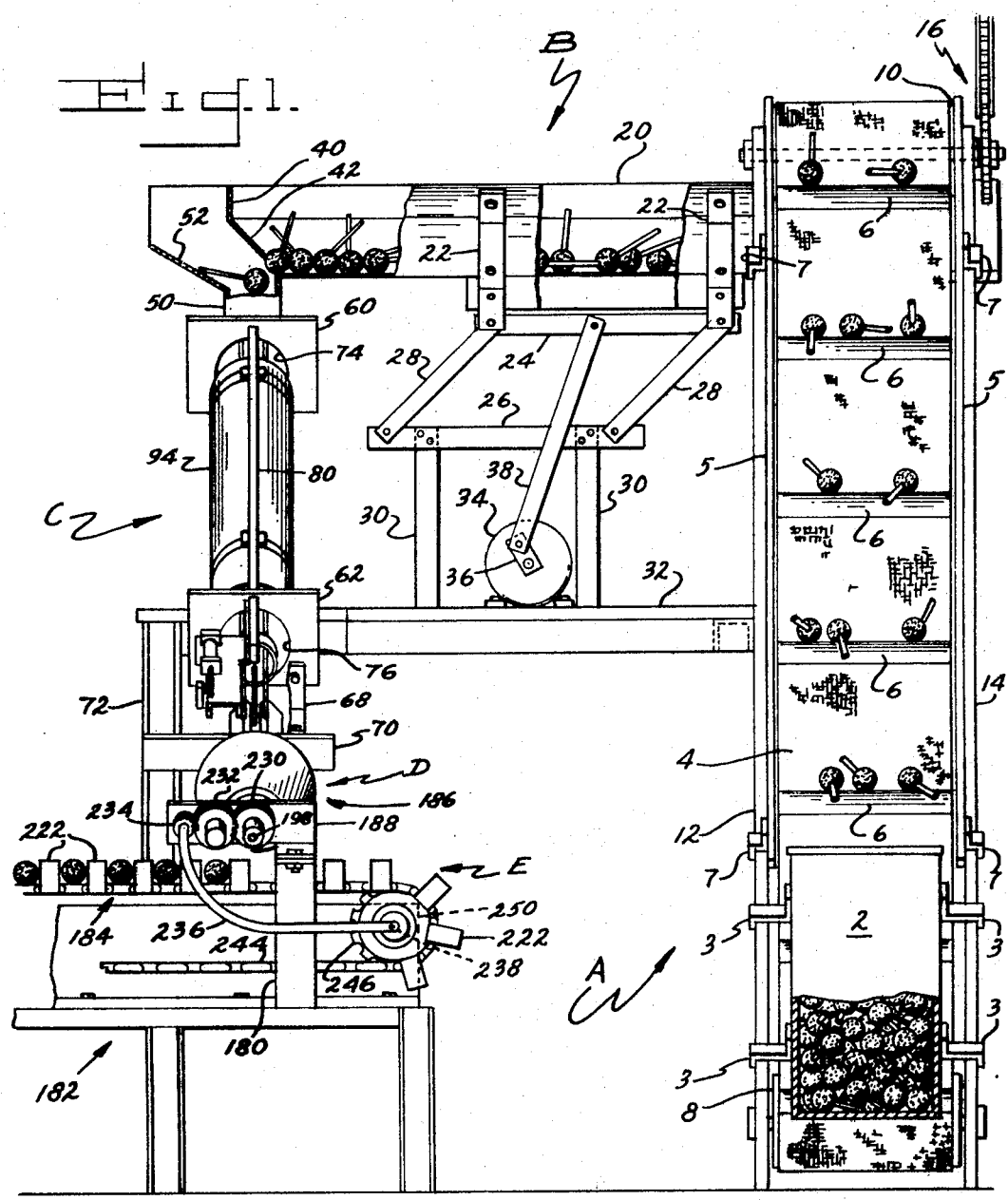

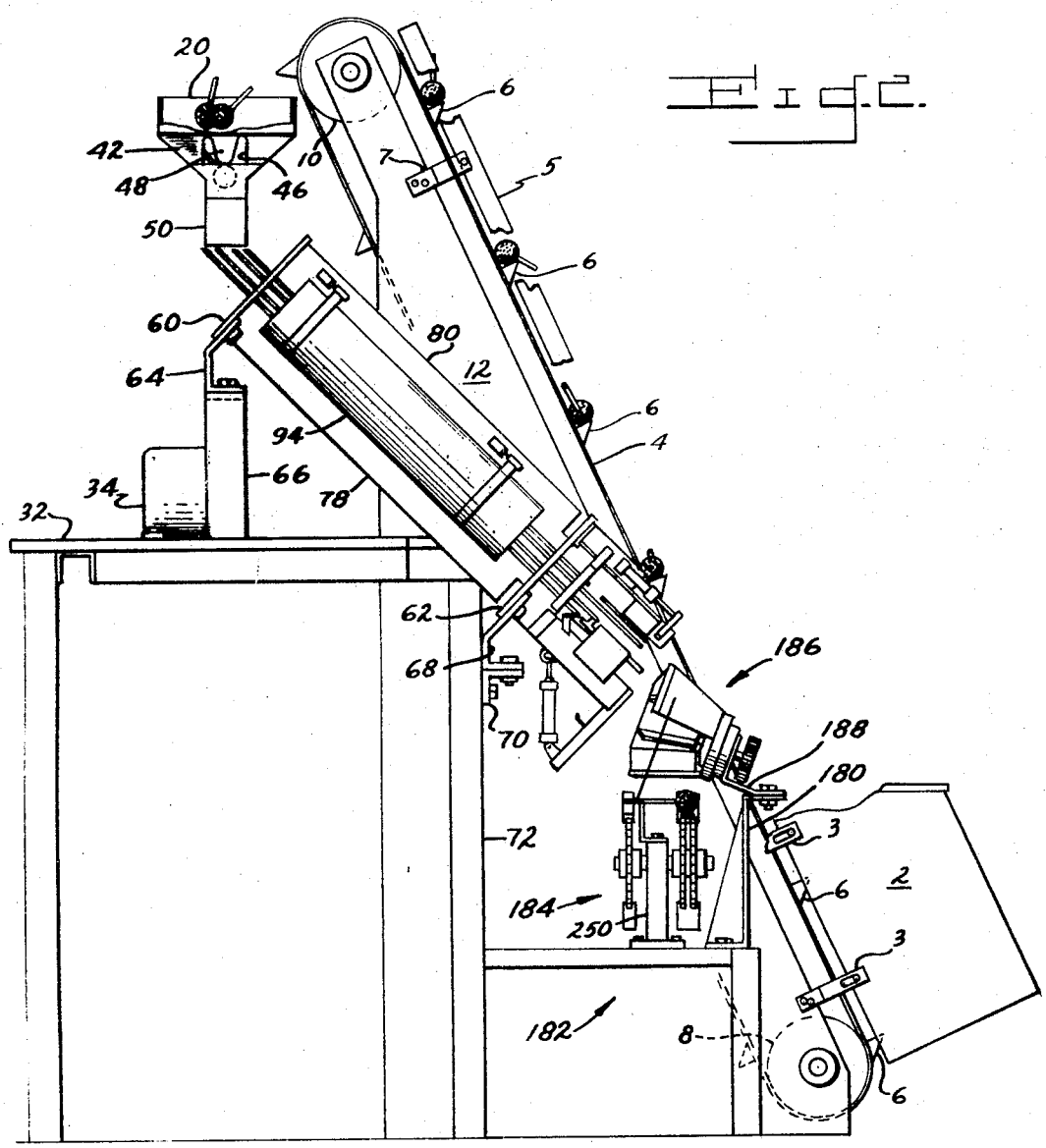

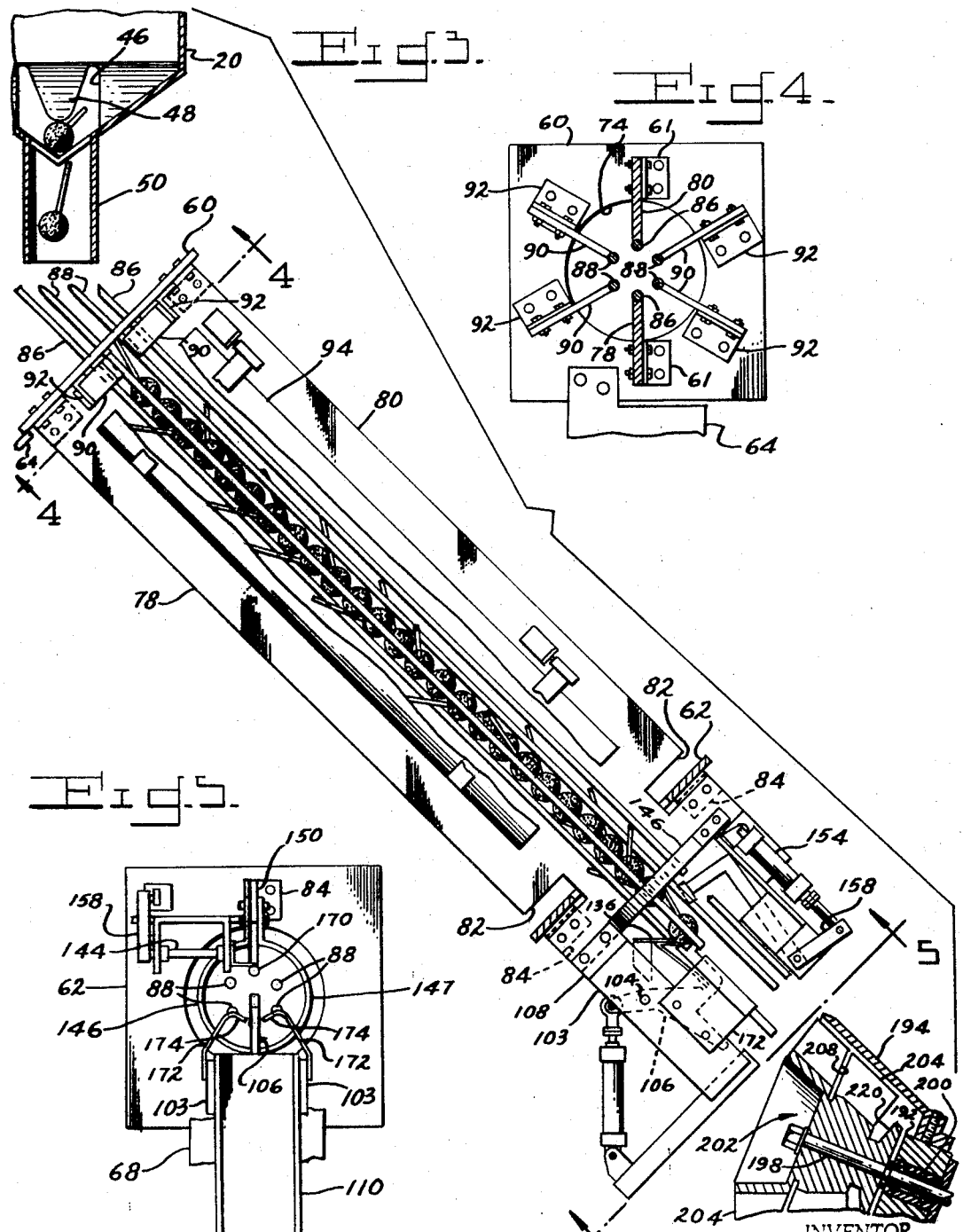

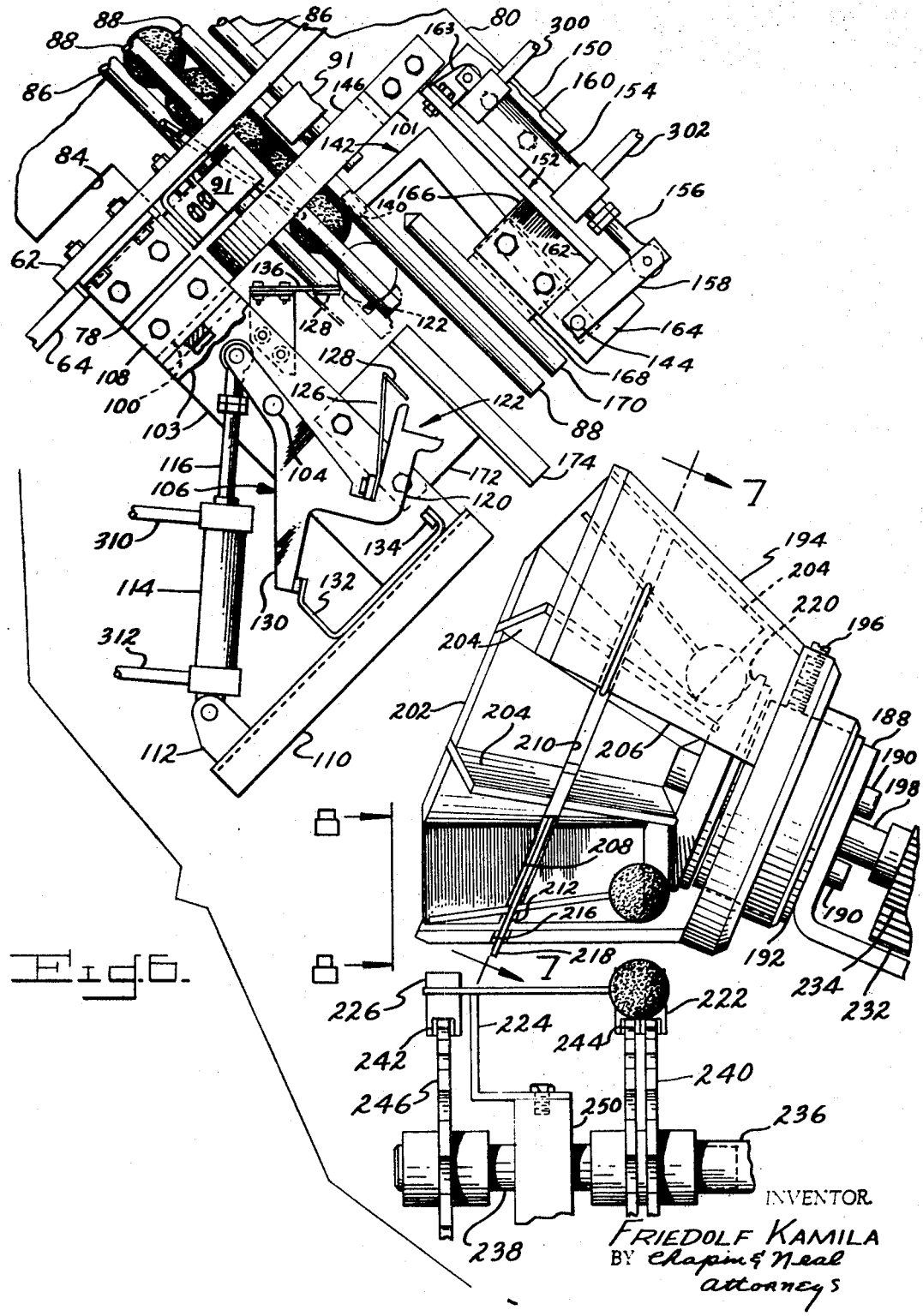

INVENTOR.
FRIEDOLF KAMILA
BY Chapin & Neal
attorneys

United States Patent Office 3,474,891
Patented Oct. 28, 1969

3,474,891
APPARATUS FOR ORIENTED STACKING AND TIMED POSITIONAL DELIVERY OF STICK LOLLIPOPS
Friedolf Kamila, Longmeadow, Mass., assignor to Package Machinery Company, East Longmeadow, Mass., a corporation of Massachusetts
Filed Dec. 26, 1967, Ser. No. 693,475
Int. Cl. B47g 47/24
U.S. Cl. 198—33         5 Claims

ABSTRACT OF THE DISCLOSURE

Apparatus for feeding lollipops having globular heads of non-precisely uniform configuration and stick handles from a bulk supply source, orienting the sticks in trailing relation, stacking the heads in vertically disposed relation, successively releasing the same in timed relation and delivering each lollipop in oriented position to a wrapping machine infeed conveyor, said apparatus including a shaker trough having a baffled exit passage insuring a single file head-first drop into a stacking column, the column having means maintaining a trailing stick relation and an escapement for timed discharge of lollipops to a vaned conical rotor device, the rotor delivering each lollipop in accurately oriented position to infeed conveyor flights.

---

This invention relates to apparatus for automatically delivering stick lollipops and the like from a bulk source of supply and feeding the same in an exactly timed and positionally oriented manner as, for example, to an infeed conveyor of existing wrapping machinery for such lollipops. The invention is particularly applicable to lollipops of the type having globular heads of non-precisely uniform configuration and from which an extremely light weight stick or tail extends.

Insofar as is known no apparatus has been available heretofore for an automatic feed to machinery for wrapping articles such as the stick lollipops. While the candy heads of lollipops may be produced by conventional procedures in a uniform manner and by dimensionally uniform equipment, the finished globular heads are invariably of a non-uniform character insofar as the precise measurements thereof are concerned. Because of this lack of uniformity of the head configuration together with the difficulties inherent in controlling the disposition of the light weight sticks or tails the usual delivery conveyor or stacking mechanisms for handling other tailed articles are not suitable for an accurately timed high speed delivery such as is needed to feed existing wrapping machinery for such lollipops. The present invention has been designed to supply a stacking column and depositing mechanism for stick lollipops in which such articles can dependably be controlled for an exactly timed high-speed delivery with the head and stick accurately oriented for deposit on an infeed conveyor.

One object of the invention is to provide mechanism to handle stick lollipops and the like from a bulk supply and feed small batches thereof into a shaking device, as a trough, in which the lollipops will be advanced in a randomly disposed and untimed relationship for separation one from the other into single file, and at the exit end of the trough to provide means, as a baffled exit passage, for insuring a single file head-first orientation in dropping the lollipops into a stacking column. In the stacking column the lollipop heads are accumulated in juxtaposed head-to-head relation, the stick handles being directed at random radially of the stacked heads. The column is constructed to provide for a substantially unimpeded free fall of the radially directed sticks as the heads descend in the column, various guiding means being provided, however, to insure the trailing relation of the tip end of each stick.

Another object of the invention is to provide an escapement mechanism for timed release of the lollipop heads for delivery into a rotary depositor device which receives the lollipops in compartmented chambers for accurately timed and accurately oriented deposit into the pockets of the wrapping machine infeed conveyor.

Other specific objects and advantages of the present invention will be apparent from the following description of an embodiment thereof as shown by the accompanying drawings, in which FIG. 1 is a front plan view of an apparatus embodying the mechanism of this invention and showing stick lollipop articles being conveyed in small batches from a hopper supply to a shaker trough, then singly into an accumulator column from which the lollipops are released to a depositor for placement on the spaced flights of an infeed conveyor;

FIG. 2 is a side elevation of the apparatus as seen from the left in FIG. 1;

FIG. 3 is a view on an enlarged scale with parts cut away and in section showing the exit end of the shaker trough, the accumulator stacking column and portions of the depositor;

FIG. 4 is a view on line 4—4 of FIG. 3;

FIG. 5 is a view on line 5—5 of FIG. 3;

FIG. 6 is a view on a still larger scale showing the escapement device at the lower end of the column together with the depositor cone and infeed conveyor;

Figure 7:
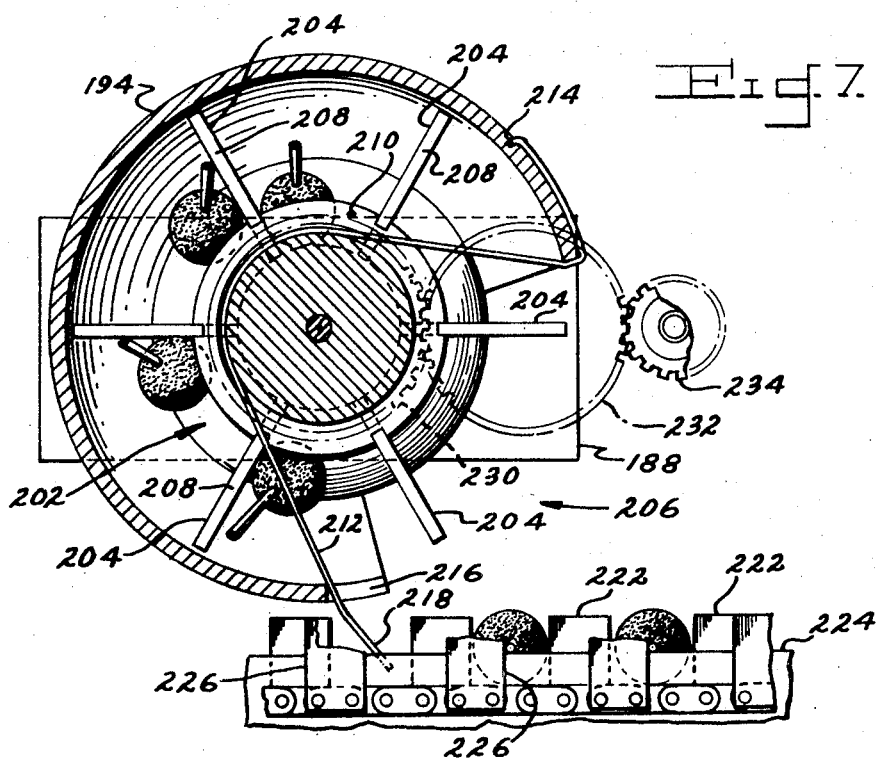
FIG. 7 is a view on line 7—7 of FIG. 6.

Referring to FIGS. 1 and 2, the apparatus as shown delivers articles as stick lollipops from a hopper supply to a separator device as a shaker trough, thence to a stacking accumulator column from which each lollipop is released by a high-speed escapement device into a cone-shaped depositor for the exactly timed oriented placement of lollipops on an infeed conveyor of a wrapping machine. The apparatus shown comprises five main sections. The hopper and elevator conveyor section is indicated generally at A; the separating shaker trough section at B; the accumulator column or stacking device section at C; the cone-shaped depositor section at D; and the wrapping machine infeed conveyor section at E.

Section A comprises, more specifically, a hopper box 2 and an inclined elevator or conveyor belt 4 having spaced flights 6. The hopper is positioned at the lower end of the upper run of belt 4.

Belt 4 is an endless belt trained around a lower roller 8 and an upper roller 10 which are suitably held for rotation between a pair of side frame members 12 and 14. Roller 10 is shown as the belt drive roll, being suitably driven as by a sprocket and drive chain at 16. The sprocket is fixed to the shaft of roller 10 on the outboard side of frame member 14. Hopper 2 is supported on the side frames by brackets as at 3 and retaining side board members as at 5 are fixed by straps 7 along each side of the belt 4.

As illustrated the stick lollipops or similar articles may be dumped manually or by any suitable means into a bin as represented by the hopper 2 which has an open side facing belt 4. As the belt passes against a bulk supply of the lollipops in the hopper each flight 6 picks up a random number of lollipops. The flights 6 as shown may be transverse cross pieces of a height approximating the diameter of a lollipop head and on which the heads of two or three lollipops will be caught to be carried upwardly by the belt. It will be noted that the number of lollipops or articles which are likely to be picked up by each flight may, of course, be varied by altering the dimensions of the flights 6, or the angle of inclination of the belt. In the apparatus as shown, each flight desirably will carry two or three lollipops. As the flights pass upwardly of the open side of the hopper, the lollipops are tumbled in more or less random fashion. It has been found that in the general relationship shown small batches of two or three lollipops are carried by each flight to the top of the conveyor. Referring to FIG. 2, as the flights pass over top roller 10, the lollipops are dropped into the receiving end of a trough 20 at section B.

The trough as shown is formed with V-shaped lower wall portions and is adapted to separate the lollipops into single file along the bottom thereof, to prevent any clumping or bunching together, and to deliver the lollipops one by one at the exit end to insure a head first relationship as each lollipop is dropped into the entrance of the column device at section C. Trough 20 is suitably mounted as on the angled supporting straps 22 (FIG. 2) which are in turn fixed to a movable upper horizontal bar 24 (FIG. 1) of a parallel linkage system. This linkage system includes a lower horizontal bar 26 and parallel links 28 pivoted to the ends of bars 24 and 26. The lower bar 26 is stationarily mounted as on the channel iron supports at 30 suitably fixed at their lower ends on a platform 32. A motor 34 is also mounted on the platform. The drive shaft of the motor carries a short crank arm 36 at the outer end of which is pivoted the lower end of an arm 38 providing the driving member for movement of the trough. The upper end of arm 38 is pivotally fixed to upper bar 24 of the parallel linkage and thus the eccentric drive will impart a shaking motion to the trough.

It will be seen that operation of motor 34 and eccentric drive of arm 38 will result in a reciprocatory action having vertical and horizontal components of motion. The horizontal component on an upward stroke of arm 38 will be in the direction away from the conveyor section A and towards section C and stacking column. Accordingly, as lollipops are deposited in the receiving end of trough 20 by belt 4, the vertical and longitudinal reciprocating movement of the trough "bounces" the candy heads in the direction of the delivery or exit end of the trough as to the left in FIG. 1. It will be appreciated from the showing of FIG. 1 that the crank arm 36 of the eccentric results in a somewhat more than simple vibrating motion. The stroke and speed of the crank may be regulated to shake the trough to an extent which frees each lollipop one from the other and prevents any bunching or clumping together as they are advanced. Also the lollipop heads being relatively heavy and having a definite mass as compared to the sticks or holders may in many cases proceed head-first and thus desirably place the sticks in trailing relation. In this manner the lollipops are moved in an untimed essentially single file formation to the exit end of the trough.

As shown by FIGS. 1 and 2, the exit end of the trough is disposed over the edge of the upper receiving end of the stacking column of section C and is formed with a chambered passage having a baffle control arrangement of walls designed to insure the single file passage of lollipops and the head-first fall thereof into the stacking column.

At this exit end of the trough a wall 40 is provided with a lower section at 42 angled at about 45° and having an opening to control passage of the heads from the trough. The opening is at 46 and is M-shaped (FIGS. 2 and 6), an upper tongue portion thereof at 48 being spaced from the end edge of the V-shaped trough bottom and providing a throat through which only a single head can pass. This construction insures the single file release of lollipops from the trough into the exit passage thereof leading to the accumulator column of section C.

Assuming, as is the case in most instances, that a lollipop will pass head-first through the throat of the opening with its stick in trailing relation the upper slots at each side of tongue 48 permit an upwardly angled stick to pass more easily through the opening without becoming wedged or otherwise obstructed at this point. And as will be best appreciated from FIG. 1, the head on passing the opening will then drop by gravity into the vertical box-like guide chute at 50 provided below the end edge of the trough bottom. The transverse dimensions of chute 50, as will be noted, are less than the length of the sticks. Accordingly, once the head falls first into the chute area the stick will remain in a trailing position and is prevented from tumbling or rolling into a leading relation.

In the event a lollipop advances through the M-shaped opening 46 with a stick in leading relationship, a stick control baffle plate at 52 is provided to reverse this position and force the head to fall into chute 50 before the stick. Set at an angle of approximately 30° to the horizontal bottom of the trough, plate 52 extends from the upper edge of the wall of chute 50 remote from the opening 46. As will be appreciated from the disposition of the lollipop entering the chute 50 as seen in FIG. 1, the sticks, being somewhat longer than the spacing between the opening 46 and the lower edge of plate 52, will first engage the plate 52 by its tip end before the head passes through opening 46. The tip of the stick is thus prevented from being angled into chute 50. And as the tip engages plate 52 it will be realized that the shaking of the trough and exit passages as a unit will tend to kick the stick upwardly as the head advances through the opening. Accordingly, the head will fall into the chute before the stick. Thus with the baffle plate arrangement as shown leading into the guide chute 50 below it, a positive means is provided at this point for the oriented head-first passage of all lollipops. As will be later apparent the sticks are maintained in trailing condition during the remainder of travel to the depositor and infeed conveyor sections.

The accumulator stacking column section C receives the lollipops from the trough guide chute 50 for stacking a supply of the same in head-to-head relationship so as to be available for a controlled high-speed timed release and oriented delivery to the depositor mechanism of section D.

As best seen in FIG. 2, the column may be supported by the table 32 on which the shaker trough is mounted. The column with its associated mechanism is mounted in a vertically disposed inclined position having an upper support plate 60 and a lower support plate 62. Upper plate 60 is fixed on an angled bracket 64 suitably fixed on a mounting member 66 anchored to table 32. Lower plate 62 is fixed on an angled bracket 68 supported by angle irons 70 on the leg at 72 of the table.

Plates 60 and 62 are provided with circular openings 74 and 76 respectively through which circumferentially spaced rod members extend to form the stacking column for the heads. Referring to FIGS. 3 and 4 a pair of diametrically opposed, longitudinally disposed, frame plate members 78 and 80 lying in a common plane extend between support plates 60 and 62 and below the latter plate. At their upper ends (FIG. 4) the plates are fastened to the underside of plate 60 by brackets at 61. At their lower ends each frame plate is notched as at 82 to extend below plate 62. The lower extensions of frame plates 78 and 80 below plate 62 are fixed to plate 62 as by the brackets at 84. These lower extensions support the escapement mechanism for releasing and ejecting the lollipops as will later be described.

As seen in FIG. 4 plates 78 and 80 extend radially inwardly of opening 74 and are fitted at their inner edges with a pair of rod members 86 suitably fixed thereto as by welding. Arranged in circumferentially spaced relation with rods 86 are similar rod members 88, a pair of rods 88 in the embodiment shown being disposed at each side of the plates 78 and 80. Rods 88 are mounted in the circumferential relation shown by radially extending spoke-like straps 90 fixed as by brackets 92 to the underside of plate 60. The circumferentially spaced rods 86 and 88 extend longitudinally through the openings of both plates 60 and 62. At their lower ends rods 88 are held in fixed position by bracketed mounting straps 91 underneath plate 62, similar to straps 90 of the upper plate. As shown by FIG. 3, the rods 86 and 88 project upwardly to receive the lollipop heads dropped from the guide chute 50.

Referring now to FIGS. 3, 4 and 5 the accumulator column of spaced rods is formed to retain a supply of lollipops in juxtaposed head-to-head stacked relation. The spaced rod members 86 and 88 permit the passage of the stick handles between them substantially free of obstruction from top to bottom although the sticks may extend radially in a haphazard or random fashion. In FIG. 3 it will also be noted that the spacing from the lower edge of guide chute 50 and support plate 60 is appreciably less than double the length of a stick handle. Thus a lollipop falling into the top of the column and tumbling in a manner to turn the stick in advance of the head will be prevented from doing so by the tip end portion striking the edge of the plate opening. Between plates 60 and 62 and strapped against opposite sides of the longitudinal plates 78 and 80 are semi-cylindrical, preferably transparent, plastic shroud members, one such member being indicated at 94 in FIG. 3. The upper and lower end edges of the shrouds are spaced from plates 60 and 62 at a distance to prevent sticks from turning forwardly of the heads in these areas. When falling within the shroud the tip ends of sticks tending to turn crosswise are kept in the desired trailing relationn by contact against the inner surface thereof. Thus, a practically unimpeded free fall of the heads with the sticks maintained in trailing relation is accomplished from top to bottom of the column.

Below plate 62 is mounted the escapement mechanism for successive release of heads in an exactly timed relation and delivery to the depositor of section D. Referring to FIG. 6 (showing a "released" position of the escapement mechanism), the bottom plate 78 terminates at the point indicated by the numeral 100. At this end is fastened a U-shaped bracket having arms at 103 carrying between them a pin at 104 for pivoting a lever 106 providing an obstructing means to prevent a free fall of the head and provide a means to positively eject each lollipop from the column. The bracket with arms 103 is held on the end of the frame plate 78 by a forked strap 108. The strap straddles and is bolted to the plate and the cross piece between arms 103 is welded to the strap.

Between the outer ends of arms 103 is a depending channel support piece 110 welded thereto and carrying at its lower end a mounting bracket at 112 for a double acting cylinder 114. A plunger 116 of cylinder 114 is pivoted at 118 to the short arm of the lever 106 on pin 104. An outer longer arm of lever 106 has an angled end 120 formed at its tip with a right angled shouldered rest at 122 as will be later described.

At the back of arm 120 is a lug 124 on which is mounted one end of a leaf spring 126 having a hooked head-engaging tip 128. As above mentioned FIG. 6 shows the extended plunger position or a released condition of lever 106. A tail 130 of the lever in this position is shown abutting a stop 132 fixed to the channel support 110. A stop 134 at the top of the channel support 110 engages the tail when the lever is at the opposite end of its stroke (as seen in FIG. 3). In the FIG. 3 position of lever 106, it will also be noted that the hooked end 128 of the leaf spring 126 is pressed back or "cocked" by a deflector strap at 136 mounted on a bracket fixed to one of the arms 103. As will later be described, the hook 128 is moved from the deflector 136 with a snap action to positively engage the lowermost head of a lollipop released from the stacked supply in the column as it drops onto the rest 122.

A presser pad or foot at 140 of the escapement means extends and retracts to hold and then release each of the lowermost heads in timed sequence. The presser pad 140 is carried on the end of a right angled lever arm at 142 pivoted on a pin 144 supported in framework mounted on the lower end portion of the upper frame plate 80.

The inner end portion of upper plate 80 is notched to provide for movement of the lever arm 142. The edge of the notch is indicated by numeral 101 and coincides with the edge of a stick deflector hoop member at 146. A similar hoop member 147 lies at the other side of plate 80 (see FIG. 5). The hoop members are spaced below plate 62 and bolted to frame plate 80 and provide a pair of final deflecting members to insure the trailing relationship of the stick handles in the area of the escapement releasing mechanism. The notched extension of the plate 80 is at 150. It supports a mounting bracket member indicated generally by numeral 152 on which is carried a double acting cylinder 154 having a plunger 156. The plunger is pivotally connected to one end of a link 158 which is rigidly fixed at its other end to the end of the right angled arm 142 carried on pin 144.

The bracket member 152 comprises an anchor plate portion 160 bolted to the notched extension 150. At right angles to portion 160 is a floor portion indicated at 162. On this portion is bolted a bracket 163 on which the end of cylinder 154 is mounted. Portion 162 extends beyond extension 150 and at its outer end is formed with an inverted U-shaped section having a narrow leg at 164 and a wider leg at 166. Between the legs 164 and 166 is held the pin 144 on which the angled presser pad lever 142 is mounted.

The wider leg 166 carries a right angled bracket 168 on the end edge of which is welded a short rod section 170 having an end to end spaced aligned relation with the rod 86 of the upper plate frame 80. The spacing between the ends of rod 86 and rod section 170 permits the passage of the presser pad 140 to and from its holding position against the lowermost head of the stack of lollipops. The movement of the arm 142 in the notched portion and thus in the plane of the frame plate 80 minimizes any chance interference with a stick handle as the lollipops pass through this area.

Referring now to FIGS. 3, 5 and 6, it will be noted that underlying the end portions of the upper rods 88 and rod extension 170 are a pair of lollipop head guide members 172 fixed to the arms 103 of the bracket supported on frame plate 78. As best seen by FIG. 5, these guides are convergently angled upwardly. The end edges are formed as inwardly and downwardly angled flanges 174 to form a supporting exit guide for directing the head of a lollipop into the depositor. As shown the facing edges of flanges 174 are in spaced relation for passage of the obstructing shouldered head rest at 122 of the releasing lever arm 120. The flanges 174 in effect provide extensions of the lower rod members 86 and 88 (see FIG. 6).

When the presser pad 140 is reciprocated to release a lowermost head and engage the next succeeding head, the released lollipop head first falls onto the shouldered rest 122 as shown in the phantom line position in FIG. 6. As this occurs, plunger 116 of the releasing cylinder begins to extend and thus pivot lever 106. As the rest 122 begins its downward stroke, arm 120 is lowered, carrying with it the leaf spring 126 as the head passes by the hook deflector strap 136. The end of the hook 128 is thus snapped downwardly to "bite" down on the upper portion of the head. It thus serves to urge and hold the head against rest 122 and in so doing assures a controlled and positive travel of the head until the trailing stick is carried with it beyond the head and presser pad 140 above it. The head is thus carried onto the exit guide flanges 174 without any chance for interference or delay by the trailing stick. It will also be appreciated from FIG. 6 that as the head is brought downwardly the rest 122 will gradually swing below the guide flanges 174 whereupon the head and stick will be completely free to fall from the end of the guide for an accurately timed ejection into the depositor.

Figure 10:
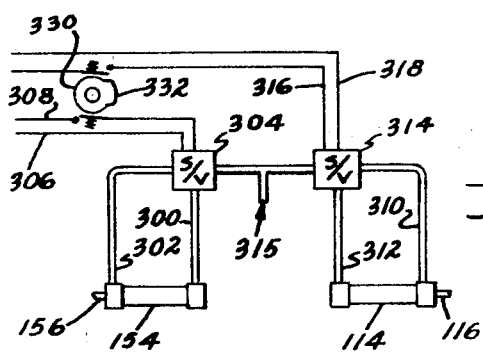
FIG. 10 is a diagrammatic showing of a timing means for operating the escapement releasing mechanism of the stacking column.

The double acting cylinders 114 and 154, for an accurately timed ejection of the heads from the column as just described, are pneumatically operated and may be synchronized by any suitable timing means. As a simplified showing of such a timing means FIG. 10 illustrates a timing switch and solenoid operated two-way valve arrangement for actuating the cylinder plunger 156 for presser pad lever 142 and cylinder plunger 116 for the head ejecting lever 106. In FIG. 10, pneumatic lines to the back and head ends of cylinder 154 are shown respectively at 300 and 302 leading to a solenoid operated two-way valve 304. Pneumatic lines leading to the back and front ends of cylinder 114 are shown respectively at 310 and 312 leading to a similar solenoid valve at 314. A source of pressure to the valves is at 315. Lead lines at 306 and 308 are shown for connection to the solenoid of valve 304 and lead lines 316 and 318 are shown for connection to the solenoid of valve 314. Switches in the lines 308 and 316 are indicated as normally open, a timer disk at 330 being provided with a lobe 332 to alternately open and close the switches in timed sequence.

Assuming clockwise rotation of the lobed disk 330, the solenoids of both valves are de-energized as seen in FIG. 10 with the lobe at a 3 o'clock position (both plungers 156 and 116 being retracted). As the lobe rotates and closes the switch of lead 308, solenoid valve 304 is energized. The valve may thus operate to open line 300 and close line 302, to extend plunger 156. The presser pad 140 (see FIG. 6) thus retracts and permits the lowermost lollipop head in the stack to drop onto the shouldered rest 122 of lever 106. Solenoid valve 314 is de-energized at this point and is in a condition wherein line 310 is open and line 312 closed, the plunger 116 being retracted and the shouldered rest 122 located in its upper receiving position (the phantom position in FIG. 6). The lollipop head thus drop onto rest 122 whereupon continued rotation of the timer disk de-energizes the solenoid valve 304. Plunger 156 thus is retracted (by opening line 302 and closing line 300) so that the presser pad again extends to hold the succeeding lollipop head and stack of heads above it in the column. Immediately thereafter further timer disk rotation closes the switch of line 316 to solenoid valve 314 and the plunger 116 is extended (by closing line 310 and opening line 312). Extension of plunger 116, as has been described, swings the shouldered rest with hook in its arcuate downward path for ejecting the lollipop onto the exit guide of flanges 174 and into the depositor of section D. The lobe 332 passing again to the 3 o'clock position de-energizes valve 314 and plunger 116 retracts to raise the shouldered rest 122 and complete the cycle just described. Other available mechanisms may obviously be employed, FIG. 10 schematically representing one such means for timing the cylinders.

Referring now to FIGS. 1 and 2 the depositor of section D is generally designated by numeral 186 and is shown mounted on a support 180 of a platform 182 on which the infeed conveyor 184 of section E is also mounted. The depositor is conically shaped and is fixed in position at the exit end of the accumulator column by an angled bracket 188 anchored to support 180.

As best seen in FIGS. 6 and 3 there is anchored to bracket 188, as by bolts at 190, a cylindrical bearing block 192 on which is collared a conically shaped outer stationary housing 194 which may be fixed by set screws as at 196 to the block 192. As shown by FIG. 3 a drive shaft 198 extends through the bracket and passes through a bearing 200 set in block 192 to drive a cup-shaped internal rotor 202. The exterior wall of the rotor is also of conical shape and is provided with a plurality of equally spaced vanes 204 extending radially therefrom. In the embodiment shown (see also FIG. 7) there are six vanes or partitions 204. It will also be noted that the outer stationary housing wall 194 is provided with an open quadrant providing a discharge port 206 at the lower right hand side of the open end of the depositor 186.

Vanes 204 of the rotor are radially slotted as at 208 (see also FIGS. 3 and 6) in a plane perpendicular to the axis of rotor rotation. The bottoms of slots 208 extend into an annular groove 210 provided in the hub of the rotor. Referring back to FIG. 7 a spring-wire stick guide 212 is shown mounted on housing wall 194. An anchored hooked end of the spring is seated in a hole as at 214 in the outer wall of the housing and passes to the upper edge of the port 206 where it is turned to project inwardly and be wrapped around groove 210 of the rotor hub. From the groove the spring wire is directed downwardly and outwardly in a forwardly angled direction to extend across to the lower edge of port 206. At this edge the wire is normally spring stressed against the edge being received in a slot cut at 216. The outer tip portion 218 of wire 212 extends beyond the housing wall and is angularly bent upwardly. This end of the wire provides a deflector or guide for accurately depositing the lollipop sticks as will be later described.

As will be appreciated from FIG. 7, the direction of rotor rotation is counterclockwise as viewed from the front end. The lollipops enter the depositor from the exit guide of the accumulator column at an upper 12 o'clock position. The timing of rotor rotation is furthermore preferably synchronized with the escapement ejection mechanism previously described in such a manner that the release of the head of a lollipop is timed for entry into the depositor approximately at the moment one of the vanes 204 has just passed the end of the exit guide at the 12 o'clock position. In other words, a lollipop enters each compartment between a pair of vane partitions in that portion thereof adjacent the leading or forward vane.

It will also be noted from FIG. 6 that the exterior wall of the vaned rotor is generally in parallel offset relation below the end of the exit guide provided by the flanges 174. Accordingly, the head of a lollipip drops from the guide into the depositor towards the bottom of the compartment or chamber between vanes 204 and onto an annular lower end plate portion of the rotor indicated at 220. The end plate is formed with an angled surface so that the head tends to fall towards the outer housing wall. Accordingly, the lollipop heads, when conveyed by the rotor to the exit edge of port 206 (see FIG. 6), will lie in a lowermost position for dropping directly into the pockets of the infeed conveyor.

Figure 8:
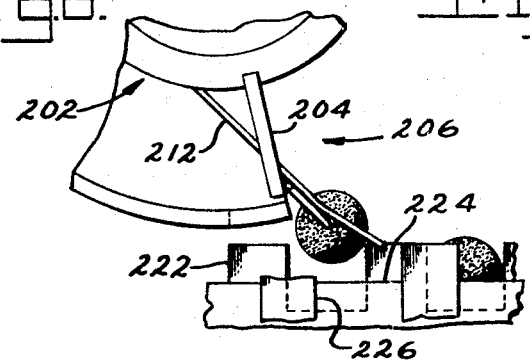
FIG. 8 is a fragmentary view as on line 8—8 of FIG. 6 showing the head of a lollipop being deposited on to the infeed conveyor and its stick in the process of being deflected into position by a spring wire guide.
Figure 9:
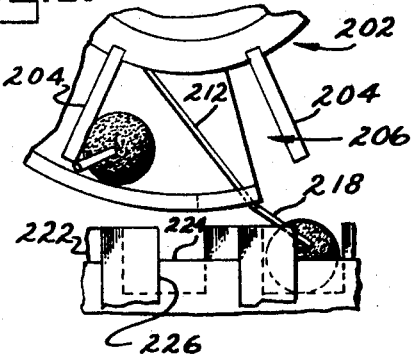
FIG. 9 is a view similar to FIG. 8 showing the wire guide member seating the stick on the conveyor.

Referring now particularly to FIGS. 7, 8, and 9 the action of the head dropping into the conveyor chain pockets is quickly followed by the stick handle being snapped into position on the conveyor against a stick "pusher" member by the spring wire 212 and free end 218. The receiving "flight" portions of the infeed conveyor chain arrangement as shown provide lollipop head pockets between closely spaced lugs 222, the stick handle being deposited cross-wise of the conveyor resting horizontally as on an angle support at 224 (see also FIG. 6). Engagement of the tip end by a conveyor pusher lug member 226 located opposite lugs 222 carries the lollipops along in the transverse position shown by FIG. 7. As the head drops off the edge of port 206 (FIG. 8), the vane partition 204 sweeps the stick handle along with it against the resistance of spring 212. As the stick leaves the edge of port 206 the spring snaps it downwardly, the angled wire end 218 wiping across the end of the stick (FIG. 9) to depress and engage the stick against the advancing pusher lug 226.

Referring now to the rotor drive, the rotor shaft 198 of depositor 186 extends through the mounting bracket 188 which supports bearing block 192 of the rotor housing. Shaft 198 may be driven by any suitable mechanism to receive and deposit the lollipops as above described. As shown herein shaft 198 is driven by a spur gear 230 (FIG. 1) in mesh with a transfer gear 232, which in turn is driven by a speed reduction gear 234, these two gears being also mounted on the bracket 188. Gear 234 is turned by a flexible drive shaft 236 having a take-off from a shaft 238 of the infeed conveyor chain sprocket at 240. The infeed conveyor chain and sprocket arrangement is shown diagrammatically, only those parts thereof essential to indicate the transversely located pocketing lugs and drive being illustrated. As seen by FIGS. 2 and 6, the conveyor includes a pair of spaced endless chains 242 and 244 carried at the infeed end on sprockets 240 and 246 carried on shaft 238 journalled in a mounting member 250 fixed on platform 182.

It is to be noted that in the passage of the lollipops from the shaker trough of section B through the column of section C and into the depositor of section D the lollipop heads and sticks should desirably move as smoothly as possible. It will also be appreciated that the vertical inclination of the column as shown in the drawings may be adjusted to suit the varying circumstances of a particular infeed conveyor or the dimensional characteristics of different head configurations and to assure a high speed and accurately oriented delivery of lollipops.

What is claimed is:

1. Apparatus for the oriented stacking and timed positional delivery of stick lollipops, comprising
   mechanism for feeding from a bulk supply small batches of lollipops and means for arranging the same in single file and an untimed release thereof singly in oriented head-first condition,
   accumulator stacking means comprising a vertically disposed column positioned to receive said oriented lollipops and having a plurality of longitudinally extending and generally circumferentially arranged spaced members surrounding a central passage to confine a supply of contiguously stacked lollipop heads, the sticks thereof extending between adjacent members in random radially directed trailing relation, and
   means supporting said column including means for deflecting the tip ends of sticks to maintain said oriented head-first condition of the lollipops during travel through the column, said column at its lower end having an escapement mechanism for holding the stacked heads and successively releasing each lowermost lollipop in timed relation from the stack, and
   depositor positioning means arranged to receive lollipops from the column for timed delivery thereof in a horizontally disposed position of the stick relative to the head at a deposit station, said depositor having an outer housing wall and a rotor internally of the wall provided with spaced vanes forming a series of movable compartments for separately carrying each lollipop released by said escapement device,
   said housing wall having an open section adjacent the bottom thereof provided a port for sequentially ejecting said lollipops from between adjacent vanes, and stick deflecting spring means carried by the housing operable to engage and lower said stick together with the head at the edge of said port for an accurately positioned placement at said deposit station.

2. Apparatus as set forth in claim 1 in which
   said single-file arranging means is a generally V-shaped trough provided with means for shaking the same vertically and forwardly in the direction of an exit end thereof, said exit end being provided with a guide chute fixed in depending relation at the edge of the trough floor, a first wall forwardly angled from said edge of the trough floor and apertured for passage of a single lollipop head toward said chute, and a second wall in opposed relation to the first wall, said second wall being forwardly angled from the top of the guide chute for engaging a stick extending in leading relationship to its head for deflecting the lollipop head first into the chute.

3. Apparatus as set forth in claim 1 in which
   said longitudinally extending spaced members of the accumulator column are wire rod elements, the upper ends of which are adjacent the outlet of said guide chute, said column is supported in an inclined position, and the escapement mechanism thereof comprises an upper reciprocable member to engage and hold the lowermost head of a stack and a lower arcuately movable head obstructing member having a spring urged hook member for engaging the top side of a lollipop head released by said holding member onto the obstructing member, said obstructing member being arcuately movable out of the path of said column passage for positive ejection of a lollipop into said depositor by the hook member.

4. Apparatus as set forth in claim 1 in which
   said depositor rotor and housing are conically shaped and mounted with the upper rotor surface in parallel relation to and offset below the ends of said accumulator column rod members, the edge of said depositor housing port being horizontally disposed.

5. Apparatus as set forth in claim 1 in combination with a conveyor having a pair of spaced chains movable in a horizontal path of travel, said chains being provided with opposed series of longitudinally spaced lugs forming pocketing means for receiving said lollipop heads and sticks thereof transversely of the conveyor the edge of said port of the depositor positioning means being disposed in adjacent horizontal relationship above said conveyor, and means for driving said depositor rotor in timed relation with said conveyor.

References Cited

UNITED STATES PATENTS

| 831,905 | 9/1906 | Thom | 193—43 |
| 2,334,004 | 11/1943 | Herzog | 193—43 |
| 3,054,170 | 9/1962 | Benichasa | 193—43 |
| 3,344,901 | 10/1967 | Schultz | 193—43 |
| 1,274,830 | 8/1918 | Wood | 198—103 |
| 1,827,900 | 10/1931 | Morrison | 221—298 |
| 3,089,614 | 5/1963 | Wise | 221—298 |
| 3,090,476 | 5/1963 | Sanders | 198—103 |

RICHARD E. AEGERTER, Primary Examiner

U.S. Cl. X.R.

193—43